(12) United States Patent
Yoshida

(10) Patent No.: US 11,913,124 B2
(45) Date of Patent: Feb. 27, 2024

(54) WATER ELECTROLYSIS DEVICE PERFORMANCE RECOVERY METHOD AND WATER ELECTROLYSIS DEVICE

(71) Applicant: HITACHI ZOSEN CORPORATION, Osaka (JP)

(72) Inventor: Tetsuya Yoshida, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 118 days.

(21) Appl. No.: 17/602,189

(22) PCT Filed: Mar. 10, 2020

(86) PCT No.: PCT/JP2020/010262
§ 371 (c)(1),
(2) Date: Oct. 7, 2021

(87) PCT Pub. No.: WO2020/208991
PCT Pub. Date: Oct. 15, 2020

(65) Prior Publication Data
US 2022/0145476 A1    May 12, 2022

(30) Foreign Application Priority Data

Apr. 12, 2019   (JP) .................................. 2019-076644

(51) Int. Cl.
*C25B 1/04*   (2021.01)
*C25B 9/73*   (2021.01)
(Continued)

(52) U.S. Cl.
CPC ................ *C25B 1/04* (2013.01); *C25B 9/23* (2021.01); *C25B 9/67* (2021.01); *C25B 9/73* (2021.01);
(Continued)

(58) Field of Classification Search
CPC ... C25B 15/033; C25B 15/027; C25B 15/021; C25B 15/02; C25B 15/023
See application file for complete search history.

(56) References Cited

U.S. PATENT DOCUMENTS

| | | | |
|---|---|---|---|
| 2008/0302651 | A1 | 12/2008 | Arai et al. |
| 2014/0096727 | A1 | 4/2014 | Ortenheim et al. |

(Continued)

FOREIGN PATENT DOCUMENTS

| | | | |
|---|---|---|---|
| JP | 60-181286 A | 9/1985 | |
| JP | 06-086939 A | 3/1994 | |

(Continued)

OTHER PUBLICATIONS

International Search Report dated Jun. 9, 2020, issued in corresponding International Application No. PCT/JP2020/010262 (3 pgs.).

(Continued)

*Primary Examiner* — Brian W Cohen
(74) *Attorney, Agent, or Firm* — Pillsbury Winthrop Shaw Pittman, LLP

(57) ABSTRACT

A method of recovering performance of a water electrolysis system is a method of recovering performance of a water electrolysis system which includes a water electrolysis stack having a solid polymer membrane, a positive electrode, and a negative electrode, the method including the steps of: bringing an operating state of the water electrolysis system into a state of low-temperature operation in which a temperature of water is lower than a temperature of water during ordinary operation in which water electrolysis is carried out by the water electrolysis stack; and in the state of the low-temperature operation, passing an electric current through each of the positive electrode and the negative electrode.

7 Claims, 2 Drawing Sheets

(51) Int. Cl.
     *C25B 9/67*          (2021.01)
     *C25B 9/23*          (2021.01)
     *C25B 15/02*        (2021.01)
     *C25B 15/021*      (2021.01)
     *C25B 15/033*      (2021.01)
     *C25B 15/023*      (2021.01)

(52) U.S. Cl.
     CPC ............ *C25B 15/02* (2013.01); *C25B 15/021* (2021.01); *C25B 15/023* (2021.01); *C25B 15/033* (2021.01)

(56) References Cited

U.S. PATENT DOCUMENTS

2014/0096728 A1*   4/2014   Ortenheim .............. C25B 11/02
                                                                  123/3
2017/0327960 A1*  11/2017   Kurashina ............... C25B 15/02

FOREIGN PATENT DOCUMENTS

| JP | 2004-277870 A | 10/2004 |
|---|---|---|
| JP | 2009-123534 A | 6/2009 |
| WO | 2006/016564 A1 | 2/2006 |

OTHER PUBLICATIONS

International Preliminary Report on Patentability dated Oct. 21, 2021, issued in corresponding International Application No. PCT/JP2020/010262 (5 pgs.).

Extended European Search Report dated Sep. 8, 2023, issued in corresponding European Patent Application No. 20788470.1 (22 pgs.).

* cited by examiner

WATER ELECTROLYSIS DEVICE PERFORMANCE RECOVERY METHOD AND WATER ELECTROLYSIS DEVICE

CROSS-REFERENCE TO RELATED APPLICATIONS

This application is the U.S. National Stage of PCT/JP2020/010262, filed Mar. 10, 2020, which claims priority to Japanese Patent Application No. 2019-076644, filed Apr. 12, 2019, the entire contents of both of which are herein incorporated by reference in their entireties.

TECHNICAL FIELD

The present invention relates to a method of recovering performance of a water electrolysis system and a water electrolysis system.

BACKGROUND ART

A water electrolysis system which electrolyzes water with use of a solid polymer membrane has been known as a conventional technique. The water electrolysis system has a problem that a cell voltage of a water electrolysis stack included in the water electrolysis system increases and consequently the water electrolysis system deteriorates in a time period shorter than a design life. As a water electrolysis system which solves such a problem, Patent Literature 1 discloses a water electrolysis system which recovers its water electrolyzing performance by carrying out electrolysis with an electric current having a given value equal to or higher than a value of a rated electric current and continues to operate.

CITATION LIST

Patent Literature

[Patent Literature 1]
Japanese Patent Application Publication Tokukai No. 2004-277870

SUMMARY OF INVENTION

Technical Problem

A maximum value of an electric current which a water electrolysis system can cause to flow is restricted by specifications etc. of a rectifier. Generally, selection of the rectifier is carried out in accordance with a rated electric current during operation of water electrolysis. The water electrolysis system disclosed in Patent Literature 1 recovers its water electrolyzing performance by carrying out electrolysis with an electric current having a given value equal to or higher than a value of a rated electric current. However, some general water electrolysis systems cannot sufficiently recover their water electrolyzing performance by the method disclosed in Patent Literature 1, because maximum values of electric currents are restricted.

Moreover, the water electrolysis system disclosed in Patent Literature 1 has a problem that the water electrolysis system consumes a large amount of electric power because the water electrolysis system carries out electrolysis with an electric current having a given value equal to or higher than a value of a rated electric current. The object of an aspect of the present invention is to recover electrolyzing performance of a water electrolysis system while saving energy.

Solution to Problem

In order to attain the above object, a method of recovering performance of a water electrolysis system in accordance with an aspect of the present invention is a method of recovering performance of a water electrolysis system which includes a water electrolysis stack having a solid polymer membrane, a positive electrode provided on one surface of the solid polymer membrane, and a negative electrode provided on the other surface of the solid polymer membrane, the method including the steps of: bringing an operating state of the water electrolysis system into a state of low-temperature operation in which a temperature of water fed to the water electrolysis stack is lower than a temperature of water fed to the water electrolysis stack during ordinary operation in which water electrolysis is carried out by the water electrolysis stack; and in the state of the low-temperature operation, passing an electric current through each of the positive electrode and the negative electrode.

A water electrolysis system in accordance with an aspect of the present invention is a water electrolysis system which electrolyzes water with use of a solid polymer membrane, including: a water electrolysis stack having the solid polymer membrane, a positive electrode provided on one surface of the solid polymer membrane, and a negative electrode provided on the other surface of the solid polymer membrane; a cooling device which cools down water to be fed to the water electrolysis stack; a controlling section which controls the cooling device so that an operating state of the water electrolysis system is brought into a state of low-temperature operation in which a temperature of water fed to the water electrolysis stack is lower than a temperature of water fed to the water electrolysis stack during ordinary operation in which water electrolysis is carried out by the water electrolysis stack; and a power source which passes an electric current through each of the positive electrode and the negative electrode during the low-temperature operation so that a voltage which is higher than a voltage occurring during the ordinary operation can occur between the positive electrode and the negative electrode.

Advantageous Effects of Invention

According to an aspect of the present invention, it is possible to recover electrolyzing performance of a water electrolysis system while saving energy.

DESCRIPTION OF EMBODIMENTS

<Configuration of Water Electrolysis System 100>

Figure 1:
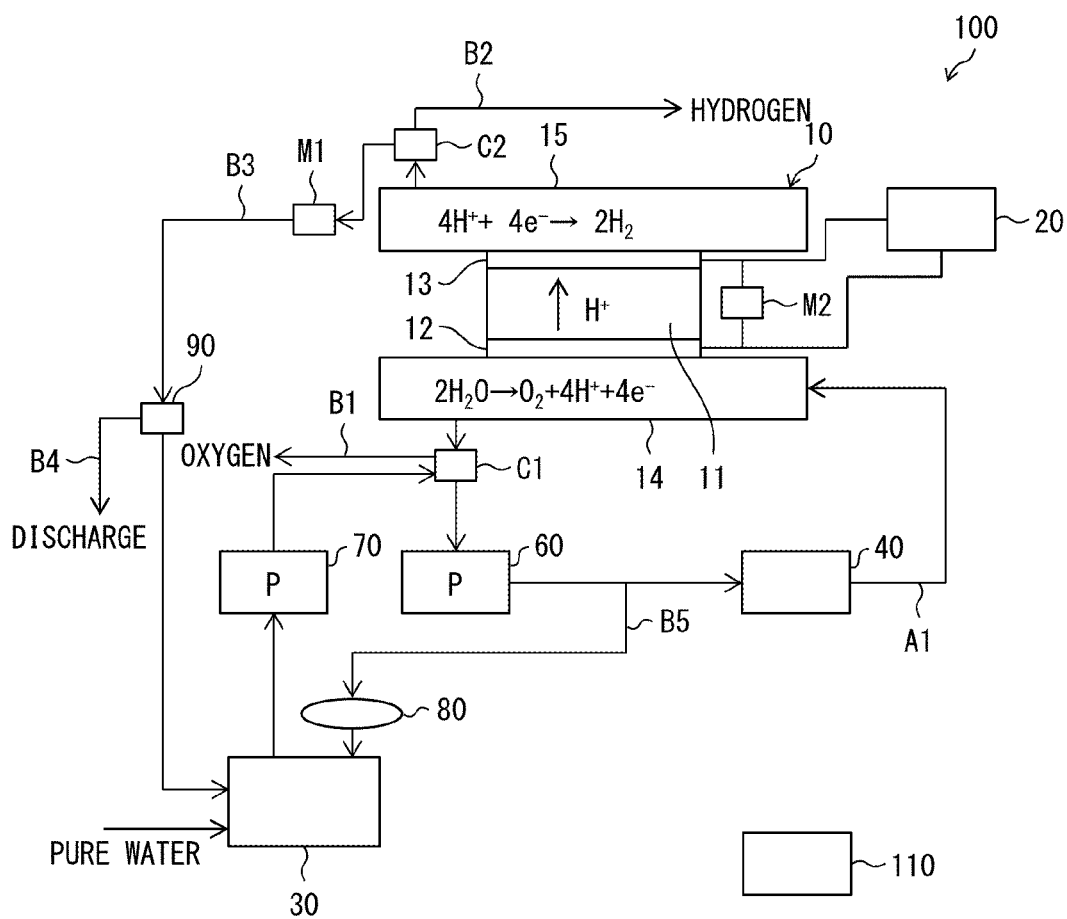
FIG. 1 is a flowchart illustrating a configuration of a water electrolysis system in accordance with an embodiment of the present invention.

A configuration of a water electrolysis system 100 is described below with reference to FIG. 1. FIG. 1 is a flowchart illustrating a configuration of a water electrolysis system 100 in accordance with an embodiment of the present invention. The water electrolysis system 100 includes, as illustrated in FIG. 1, a water electrolysis stack 10, a power source 20, a feed-water tank 30, a cooling device 40, a circulating pump 60, a feed-water pump 70, a filter 80, an oxygen gas-liquid separator C1, a hydrogen gas-liquid separator C2, and a controlling section 110.

The water electrolysis system 100 also includes a circulation line A1, an oxygen line B1, a hydrogen line B2, a hydrogen blow water line B3, a branch line B4, an oxygen blow water line B5, a first measuring section M1, a second measuring section M2, and a switching valve 90. The water electrolysis system 100 is a system which electrolyzes water with use of a solid polymer membrane 11.

The water electrolysis stack 10 includes the solid polymer membrane 11, a positive electrode 12, and a negative electrode 13. The water electrolysis stack 10 electrolyzes water with use of the solid polymer membrane 11 so that oxygen is generated at the positive electrode 12 and hydrogen is generated at the negative electrode 13. The solid polymer membrane 11 is a hydrogen ion conducting membrane which conducts a hydrogen ion.

The positive electrode 12 is provided on one surface of the solid polymer membrane 11, and the negative electrode 13 is provided on the other surface of the solid polymer membrane 11. An inside of the water electrolysis stack 10 is partitioned into a positive electrode chamber 14 and a negative electrode chamber 15 by the solid polymer membrane 11. The power source 20 is a direct-current power source, and is connected to the positive electrode 12 and the negative electrode 13 by wiring.

The feed-water tank 30 stores therein pure water which is fed from outside this system and which is used to replace water that has been used in a process of water electrolysis. The water stored in the feed-water tank 30 flows to the feed-water pump 70. The feed-water pump 70 is a pump which feeds water from the feed-water tank 30 to the oxygen gas-liquid separator C1. The feed-water pump 70 is provided between the oxygen gas-liquid separator C1 and the feed-water tank 30.

The cooling device 40 is a device which cools down water to be fed to the water electrolysis stack 10. In other words, the cooling device 40 is a device which cools down water that flows to the circulation line A1. The circulation line A1 is a line through which water circulates through the positive electrode chamber 14, the cooling device 40, the circulating pump 60, and the oxygen gas-liquid separator C1.

The cooling device 40 is, for example, a heat exchanger, and carries out cooling in the system by introducing thereinto a cooling medium from a cooling tower or a chiller. The cooling device 40 is provided to a part of the circulation line A1 which part is located between the positive electrode chamber 14 and the circulating pump 60. This prevents a gas-liquid two-phase flow and prevents an excessive increase in pressure loss, and consequently makes it possible for water to smoothly flow to the heat exchanger.

The oxygen gas-liquid separator C1 stores therein water from the positive electrode chamber 14 and water from the feed-water tank 30. The oxygen gas-liquid separator C1 is provided to a part of the circulation line A1 which part is located between the positive electrode chamber 14 and the circulating pump 60. Note, however, that the oxygen gas-liquid separator C1 is provided to the circulation line A1 so as to be located on a side of the circulating pump 60 which side is opposite from a side on which the cooling device 40 is provided. Water stored in the oxygen gas-liquid separator C1 flows to the circulating pump 60. The circulating pump 60 is a circulating pump which feeds water from the oxygen gas-liquid separator C1 to the positive electrode chamber 14 so that water which flows to the circulation line A1 circulates. The circulating pump 60 is provided to a part of the circulation line A1 which part is located between the oxygen gas-liquid separator C1 and the cooling device 40.

The filter 80 is provided to the oxygen blow water line B5 which is branched from a part of the circulation line A1 which part is located between the cooling device 40 and the circulating pump 60. The filter 80 is a filter which removes a contaminant contained in water that flows to the oxygen blow water line B5.

The first measuring section M1 measures an electric conductivity (specific resistance) of hydrogen blow water on a negative electrode 13 side of the water electrolysis stack 10, that is, an electric conductivity (specific resistance) of hydrogen blow water on a negative electrode chamber 15 side which hydrogen blow water is generated in the negative electrode chamber 15. The first measuring section M1 is an electric conductivity meter or may be alternatively a specific resistance meter. The second measuring section M2 is a voltmeter which measures a voltage occurring between the positive electrode 12 and the negative electrode 13. The hydrogen blow water on the negative electrode chamber 15 side is water which passes from a positive electrode 12 side to the negative electrode 13 side. The controlling section 110 controls each section of the water electrolysis system 100 so as to control operation of the water electrolysis system 100.

<Process During Ordinary Operation of Water Electrolysis System 100>

Next, a process carried out during the ordinary operation of the water electrolysis system 100 will be described below. A case is considered here in which (i) a rated hydrogen generating amount of the water electrolysis system 100 is 10 (Nm$^3$/h), (ii) a rated electric current density of the water electrolysis stack 10 is 2 (A/cm$^2$), and (iii) a rated temperature of the water electrolysis stack 10 is 80° C.

In this case, a water temperature in the water electrolysis stack 10 during the ordinary operation of the water electrolysis system 100 is 80° C. The water temperature in the water electrolysis stack 10 rises by a cell (not illustrated), included in the water electrolysis stack 10, generating heat. During the ordinary operation, the controlling section 110 controls the cooling device 40 to cool down water so that the water temperature in the water electrolysis stack 10 does not rise to much more than 80° C.

The water fed to the positive electrode chamber 14 by the circulating pump 60 is electrolyzed by the power source 20 passing an electric current through each of the positive electrode 12 and the negative electrode 13. This causes oxygen to be generated in the positive electrode chamber 14 and causes hydrogen to be generated in the negative electrode chamber 15. When the water fed to the positive electrode chamber 14 is electrolyzed, a hydrogen ion moves from the positive electrode chamber 14 to the negative electrode chamber 15. Specifically, a chemical reaction represented by the following formula (1) occurs in the positive electrode chamber 14, and a chemical reaction represented by the following formula (2) occurs in the negative electrode chamber 15.

$$2H_2O \rightarrow O_2 + 4H^+ + 4e^- \tag{1}$$

$$4H^+ + 4e^- \rightarrow 2H_2 \tag{2}$$

The oxygen generated in the positive electrode chamber 14 is transferred to the oxygen gas-liquid separator C1, and the oxygen gas-liquid separator C1 separates the oxygen generated in the positive electrode chamber 14 and the water. The water is fed from the oxygen gas-liquid separator C1 to the positive electrode chamber 14 by the circulating pump 60. The water flows to the feed-water tank 30 and the cooling device 40 as oxygen blow water on a positive electrode chamber 14 side. The oxygen is discharged outside the system through the oxygen line B1 connected to the oxygen gas-liquid separator C1.

The hydrogen generated in the negative electrode chamber 15 is transferred to the hydrogen gas-liquid separator C2, and the hydrogen gas-liquid separator C2 separates the hydrogen generated in the negative electrode chamber 15 and the water. The water stored in the hydrogen gas-liquid separator C2 flows through the hydrogen blow water line B3 as hydrogen blow water. The hydrogen blow water on the negative electrode chamber 15 side flows through the hydrogen blow water line B3, passes through the switching valve 90, and is fed to the feed-water tank 30. That is, during the ordinary operation, the hydrogen blow water on the negative electrode chamber 15 side is reused. The hydrogen is discharged outside the system through the hydrogen line B2 connected to the hydrogen gas-liquid separator C2. The switching valve 90 is controlled by the controlling section 110 to switch between a flow path on a feed-water tank 30 side and a flow path on a branch line B4 side.

In the solid polymer membrane 11, a contaminant (for example, a contamination (cation) such as a calcium ion or a magnesium ion) is accumulated. This is because the contaminant contained in the water flowing through the circulation line A1 adheres to the solid polymer membrane 11. Accumulation of the contaminant in the solid polymer membrane 11 causes an increase in cell voltage of the water electrolysis stack 10.

A case is considered here in which the water electrolysis system 100 is in a state of the ordinary operation. In this case, in the water electrolysis system 100, the second measuring section M2 measures a voltage occurring between the positive electrode 12 and the negative electrode 13, and the first measuring section M1 measures an electric conductivity of the hydrogen blow water on the negative electrode 13 side of the water electrolysis stack 10, that is, an electric conductivity of the hydrogen blow water on the negative electrode chamber 15 side which hydrogen blow water has been generated in the negative electrode chamber 15. Note that in a case where the first measuring section M1 is not included in the water electrolysis system 100, a user may extract, as appropriate, the hydrogen blow water on the negative electrode chamber 15 side and measure, with use of an electric conductivity meter, the electric conductivity of the extracted hydrogen blow water on the negative electrode chamber 15 side.

The user compares, with a first threshold, the voltage which occurs between the positive electrode 12 and the negative electrode 13 and which has been measured by the second measuring section M2, and compares, with a second threshold, the electric conductivity which has been measured by the first measuring section M1. In a case where the voltage occurring between the positive electrode 12 and the negative electrode 13 is equal to or higher than the first threshold and the electric conductivity is equal to or higher than the second threshold, the user brings an operating state of the water electrolysis system 100 into a state of low-temperature operation.

An example of the first threshold is 105% of a voltage occurring between the positive electrode 12 and the negative electrode 13 during the ordinary operation. A value of the first threshold may be set to any value, depending on performance which the user desires. An example of the second threshold is 1.5 ($\mu$S/cm). In this case, in a case where the electric conductivity of the hydrogen blow water is equal to or higher than 1.5 ($\mu$S/cm), the operating state of the water electrolysis system 100 is brought into the state of the low-temperature operation. When the low-temperature operation is started, the contaminant comes out from the solid polymer membrane 11 into the hydrogen blow water. Therefore, when the low-temperature operation is started, the electric conductivity of the hydrogen blow water becomes much higher than the second threshold. A value of the second threshold may be set to any value, depending on performance which the user desires.

According to the above configuration, it is determined whether performance of the water electrolysis system 100 is deteriorated, by checking whether the voltage occurring between the positive electrode 12 and the negative electrode 13 is equal to or higher than the first threshold and the electric conductivity of the hydrogen blow water on the negative electrode chamber 15 side is equal to or higher than the second threshold. Thus, since the operating state of the water electrolysis system 100 is brought into the state of the low-temperature operation only in a case where it is found that the performance of the water electrolysis system 100 is deteriorated, it is possible to recover electrolyzing performance of the water electrolysis system 100 at an appropriate timing.

Moreover, since the water electrolysis system 100 includes the first measuring section M1 and the second measuring section M2, it is possible to measure the electric conductivity of the hydrogen blow water on the negative electrode chamber 15 side and the voltage occurring between the positive electrode 12 and the negative electrode 13. Thus, it is possible to appropriately determine whether the performance of the water electrolysis system 100 is deteriorated.

Note that the user may bring the operating state of the water electrolysis system 100 into the state of the low-temperature operation only in a case where the voltage occurring between the positive electrode 12 and the negative electrode 13 is equal to or higher than the first threshold. In this case, the user determines whether to bring the operating state of the water electrolysis system 100 into the state of the low-temperature operation, by comparing, with the first threshold, the voltage which occurs between the positive electrode 12 and the negative electrode 13 and which has been measured by the second measuring section M2. Note that, in this case, the first measuring section M1 does not need to be included in the water electrolysis system 100.

The user further compares, with a third threshold, the electric conductivity which has been measured by the first measuring section M1. In a case where the electric conductivity is equal to or lower than the third threshold, the user causes the low-temperature operation of the water electrolysis system 100 to be ended. After causing the low-temperature operation of the water electrolysis system 100 to be ended, the user may cause the ordinary operation of the water electrolysis system 100 to be started. An example of the third threshold is 1.0 ($\mu$S/cm). It is assumed here that the operating state of the water electrolysis system 100 has been brought into the state of the low-temperature operation under any one of the following two conditions. In this case, in a case where the electric conductivity of the hydrogen blow water is equal to or lower than 1.0 ($\mu$S/cm), the user causes the low-temperature operation of the water electrolysis system 100 to be ended.

The two conditions are as follows: the voltage occurring between the positive electrode 12 and the negative electrode 13 is equal to or higher than the first threshold; and the voltage occurring between the positive electrode 12 and the negative electrode 13 is equal to or higher than the first threshold and the electric conductivity of the hydrogen blow water is equal to or higher than the second threshold. A value of the third threshold may be set to any value, depending on performance which the user desires, and may be lower than the value of the second threshold.

According to the above configuration, it is determined whether the performance of the water electrolysis system 100 is sufficiently recovered, by checking whether the electric conductivity of the hydrogen blow water on the negative electrode chamber 15 side is equal to or lower than the third threshold. Thus, since the low-temperature operation of the water electrolysis system 100 is ended only in a case where it is found that the performance of the water electrolysis system 100 is sufficiently recovered, it is possible to cause the low-temperature operation of the water electrolysis system 100 to be ended at an appropriate timing.

<Process During Low-Temperature Operation of Water Electrolysis System 100>

Next, a process carried out during the low-temperature operation of the water electrolysis system 100, that is, a method of recovering the performance of the water electrolysis system 100 will be described below. Specifically, the user changes setting of operation of the water electrolysis system 100 so that the setting of the operation of the water electrolysis system 100 is switched from setting of the ordinary operation to setting of the low-temperature operation. When the setting of the operation of the water electrolysis system 100 is switched to the setting of the low-temperature operation, the controlling section 110 controls the cooling device 40 to cool down water to be fed to the water electrolysis stack 10 more than during the ordinary operation.

In this manner, the controlling section 110 controls the cooling device 40 so that the operating state of the water electrolysis system 100 is brought into the state of the low-temperature operation in which a temperature of water fed to the water electrolysis stack 10 is lower than a temperature of water fed to the water electrolysis stack 10 during the ordinary operation in which water electrolysis is carried out by the water electrolysis stack 10. In so doing, the controlling section 110 preferably controls the cooling device 40 so that the temperature of the water to be fed to the water electrolysis stack 10 is, for example, not lower than 5° C. but not higher than 60° C. Further, the controlling section 110 more preferably controls the cooling device 40 so that the temperature of the water to be fed to the water electrolysis stack 10 is not lower than 15° C. but not higher than 35° C.

During the low-temperature operation of the water electrolysis system 100, the power source 20 passes an electric current through each of the positive electrode 12 and the negative electrode 13. In this manner, the power source 20 passes the electric current through each of the positive electrode 12 and the negative electrode 13 during the low-temperature operation of the water electrolysis system 100 so that a voltage higher than a voltage occurring during the ordinary operation of the water electrolysis system 100 can occur between the positive electrode 12 and the negative electrode 13.

According to the above configuration, the electric current is passed in a state where the temperature of the water fed to the water electrolysis stack 10 is lower than the temperature of the water fed during the ordinary operation. As a result, a voltage higher than a voltage occurring in the water electrolysis stack 10 during the ordinary operation occurs in the water electrolysis stack 10. This causes a contaminant in the water electrolysis stack 10 to be removed during the low-temperature operation. It is therefore possible to decrease the voltage occurring in the water electrolysis stack 10 during the ordinary operation.

Thus, it is possible to recover the electrolyzing performance of the water electrolysis system 100 while saving energy, without increasing a value of the electric current applied to the water electrolysis stack 10. Moreover, the water electrolysis system 100 in accordance with an aspect of the present invention is capable of sufficiently recovering its electrolyzing performance by carrying out the low-temperature operation, whereas a conventional water electrolysis system is incapable of sufficiently recovering its electrolyzing performance because a maximum value of an electric current of a rectifier used is restricted.

When the power source 20 passes the electric current through each of the positive electrode 12 and the negative electrode 13, the contaminant in the solid polymer membrane 11 is removed. The contaminant passes through the solid polymer membrane 11 and moves to the negative electrode chamber 15. In so doing, hydrogen blow water on the negative electrode chamber side which hydrogen blow water contains the contaminant flows in the hydrogen blow water line B3. The hydrogen blow water on the negative electrode chamber 15 side which hydrogen blow water contains the contaminant is discharged outside the system through the branch line B4 which is branched from the hydrogen blow water line B3. At a connection between the hydrogen blow water line B3 and the branch line B4, the switching valve 90 is provided. During the low-temperature operation, the hydrogen blow water on the negative electrode chamber 15 side which hydrogen blow water is discharged from the negative electrode chamber 15 is caused, by the switching valve 90, not to flow to the feed-water tank 30 but to flow to the branch line B4.

Note that the water electrolysis system 100 may be arranged as follows: the water electrolysis system 100 which does not include the branch line B4 is caused to carry out the ordinary operation; before the water electrolysis system 100 is caused to carry out the low-temperature operation, the branch line B4 is attached to the hydrogen blow water line B3; and then, during the low-temperature operation, the hydrogen blow water on the negative electrode chamber 15 side is discharged outside the system through the branch line B4.

Note also that, instead of the branch line B4 and the switching valve 90 being provided to the water electrolysis system 100, a filter (not illustrated) may be provided to the hydrogen blow water line B3. The contaminant contained in the hydrogen blow water on the negative electrode chamber 15 side is removed by the filter during the low-temperature operation. The filter may be replaced with another filter after the low-temperature operation.

<Low-Temperature Operation Test of Water Electrolysis System 100>

Next, a case where a low-temperature operation test of the water electrolysis system 100 was carried out will be described below. A water electrolysis system 100 was used which was arranged such that a rated electric current density of a water electrolysis stack 10 was 2 (A/cm$^2$) and a rated temperature of the water electrolysis stack 10 was 80° C. The water electrolysis system 100 was caused to carry out low-temperature operation. In so doing, a temperature of water in the water electrolysis stack 10 was set to not lower than 25° C. but not higher than 30° C. An operation voltage of a cell during ordinary operation before a low-temperature operation test of the water electrolysis system 100 was started was 1.92 (V), and the operation voltage of the cell during an initial stage of the ordinary operation was 1.80 (V).

A branch line B4 was attached to a hydrogen blow water line B3 so that hydrogen blow water on a negative electrode chamber 15 side was discharged outside a system. The water electrolysis system 100 was caused to carry out DSS (Daily Start and Stop) operation in a state where a temperature of water fed to the water electrolysis stack 10 was kept low. At an end of each test day, the temperature of the water in the water electrolysis stack 10 was raised to 80° C. In this manner, a graph shown in FIG. 2 was obtained. Furthermore, the hydrogen blow water on the negative electrode chamber side was extracted as appropriate during the ordinary operation, and an electric conductivity of the extracted hydrogen blow water on the negative electrode chamber 15 side was measured with use of an electric conductivity meter, and whether or not a contaminant was present was checked in parallel to the ordinary operation.

Figure 2:
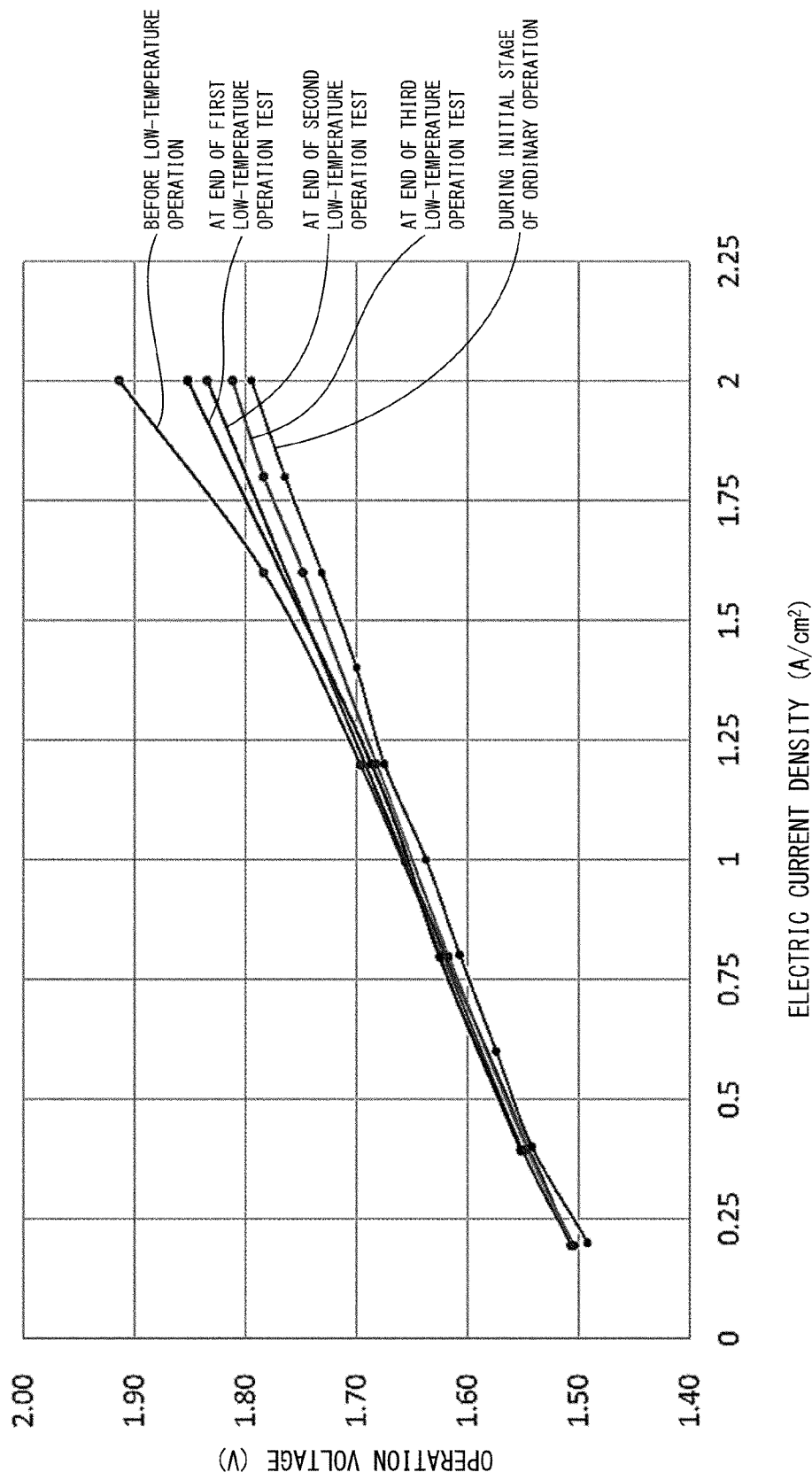
FIG. 2 is a graph showing an operation voltage of a cell during ordinary operation which operation voltage was obtained after a low-temperature operation test of the water electrolysis system illustrated in FIG. 1 was carried out.

FIG. 2 is a graph showing the operation voltage of the cell during the ordinary operation which operation voltage was obtained after the low-temperature operation test of the water electrolysis system 100 illustrated in FIG. 1 was carried out. In FIG. 2, a horizontal axis indicates an electric current density (A/cm$^2$) during the operation, and a vertical axis indicates the operation voltage (V) of the cell included in the water electrolysis stack 10 during the operation. As shown in FIG. 2, it was found that as the low-temperature operation test was repeated, the operation voltage of the cell particularly in a case where the electric current density was high became closer to the operation voltage of the cell during the initial stage of the ordinary operation.

The electric conductivity of the hydrogen blow water on the negative electrode chamber 15 side at a start of the low-temperature operation test was 8.0 (μS/cm). However, as the low-temperature operation test was repeated, the electric conductivity of the hydrogen blow water on the negative electrode chamber 15 side gradually decreased, and ultimately decreased to 0.9 (μS/cm). It was thus found that discharge of the contaminant from a solid polymer membrane 11 by the low-temperature operation allowed a decrease in electric conductivity of the hydrogen blow water on the negative electrode chamber 15 side and thereby allowed recovery of performance of the water electrolysis system 100.

As is clear from the above, it is possible to discharge a contaminant accumulated on the solid polymer membrane 11 by passing an electric current in a state where a cell voltage is maintained at a high voltage while a temperature of water in the water electrolysis stack 10 is maintained at a low temperature, and ultimately possible to recover the performance of the water electrolysis system 100. Further, the hydrogen blow water on the negative electrode chamber 15 side is not returned to the feed-water tank 30, and continues to be discharged outside the system until the electric conductivity of the hydrogen blow water on the negative electrode chamber 15 side is decreased to a given index or lower. This makes it possible to decrease the cell voltage to a value close to a value of the cell voltage at the initial stage.

The present invention is not limited to the above-described embodiments, and can be altered in various ways within the scope of the claims. The present invention also encompasses, in its technical scope, any embodiment derived by combining technical means disclosed in differing embodiments.

INDUSTRIAL APPLICABILITY

The present invention is applicable to electrolysis of water with use of a solid polymer membrane.

REFERENCE SIGNS LIST

10 Water electrolysis stack
11 Solid polymer membrane
12 Positive electrode
13 Negative electrode
20 Power source
40 Cooling device
100 Water electrolysis system
110 Controlling section
M1 First measuring section
M2 Second measuring section

The invention claimed is:

1. A method of recovering performance of a water electrolysis system which includes a water electrolysis stack having a solid polymer membrane, a positive electrode provided on one surface of the solid polymer membrane, and a negative electrode provided on the other surface of the solid polymer membrane, the method comprising the steps of:
    bringing an operating state of the water electrolysis system into a state of low-temperature operation in which a temperature of water fed to the water electrolysis stack is lower than a temperature of water fed to the water electrolysis stack during ordinary operation in which water electrolysis is carried out by the water electrolysis stack;
    in the state of the low-temperature operation, passing an electric current through each of the positive electrode and the negative electrode; and
    in the state of the low-temperature operation, recovering the solid polymer membrane wherein recovering the solid polymer membrane includes removing contaminant in the solid polymer membrane while maintaining the polarity of the electric current passed through the positive and negative electrodes.

2. The method as set forth in claim 1, further comprising the steps of:
    in a state of the ordinary operation, measuring a voltage occurring between the positive electrode and the negative electrode; and
    comparing the voltage occurring between the positive electrode and the negative electrode with a first threshold,
    in a case where the voltage occurring between the positive electrode and the negative electrode is equal to or higher than the first threshold, the operating state of the water electrolysis system being brought into the state of the low-temperature operation.

3. A method of recovering performance of a water electrolysis system which includes a water electrolysis stack having a solid polymer membrane, a positive electrode provided on one surface of the solid polymer membrane, and a negative electrode provided on the other surface of the solid polymer membrane, the method comprising the steps of:
    bringing an operating state of the water electrolysis system into a state of low-temperature operation in which a temperature of water fed to the water electrolysis stack is lower than a temperature of water fed to the water electrolysis stack during ordinary operation in which water electrolysis is carried out by the water electrolysis stack;

in the state of the low-temperature operation, passing an electric current through each of the positive electrode and the negative electrode;

in a state of the ordinary operation, measuring a voltage occurring between the positive electrode and the negative electrode;

comparing the voltage occurring between the positive electrode and the negative electrode with a first threshold, in a case where the voltage occurring between the positive electrode and the negative electrode is equal to or higher than the first threshold, the operating state of the water electrolysis system being brought into the state of the low-temperature operation, measuring an electric conductivity of hydrogen blow water generated on a negative electrode side of the water electrolysis stack; and comparing the electric conductivity with a third threshold, in a case where the electric conductivity is equal to or lower than the third threshold, the low-temperature operation of the water electrolysis system being ended.

4. A method of recovering performance of a water electrolysis system which includes a water electrolysis stack having a solid polymer membrane, a positive electrode provided on one surface of the solid polymer membrane, and a negative electrode provided on the other surface of the solid polymer membrane, the method comprising the steps of:

bringing an operating state of the water electrolysis system into a state of low-temperature operation in which a temperature of water fed to the water electrolysis stack is lower than a temperature of water fed to the water electrolysis stack during ordinary operation in which water electrolysis is carried out by the water electrolysis stack;

in the state of the low-temperature operation, passing an electric current through each of the positive electrode and the negative electrode in a state of the ordinary operation, measuring a voltage occurring between the positive electrode and the negative electrode;

measuring an electric conductivity of hydrogen blow water generated on a negative electrode side of the water electrolysis stack;

comparing the voltage occurring between the positive electrode and the negative electrode with a first threshold; and comparing the electric conductivity with a second threshold, in a case where (i) the voltage occurring between the positive electrode and the negative electrode is equal to or higher than the first threshold and (ii) the electric conductivity is equal to or higher than the second threshold, the operating state of the water electrolysis system being brought into the state of the low-temperature operation.

5. The method as set forth in claim 4, further comprising the step of:

comparing the electric conductivity with a third threshold, in a case where the electric conductivity is equal to or lower than the third threshold, the low-temperature operation of the water electrolysis system being ended.

6. The method as set forth in claim 1, wherein the recovering the solid polymer membrane includes discharging the removed contaminant out of the water electrolysis system.

7. The method as set forth in claim 1, further comprising the step of:

in the state of the low-temperature operation, keeping the temperature of water fed to the water electrolysis stack lower than the temperature of water fed to the water electrolysis stack during the ordinary operation, thereby causing a voltage between the positive electrode and the negative electrode to be higher than in a state of the ordinary operation.

* * * * *